(12) United States Patent
Yamazaki et al.

(10) Patent No.: US 10,796,223 B2
(45) Date of Patent: Oct. 6, 2020

(54) HIERARCHICAL NEURAL NETWORK APPARATUS, CLASSIFIER LEARNING METHOD AND DISCRIMINATING METHOD

(71) Applicant: Mitsubishi Electric Corporation, Tokyo (JP)

(72) Inventors: Takashi Yamazaki, Tokyo (JP); Wataru Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 576 days.

(21) Appl. No.: 15/110,362

(22) PCT Filed: Feb. 10, 2014

(86) PCT No.: PCT/JP2014/053056
§ 371 (c)(1),
(2) Date: Jul. 7, 2016

(87) PCT Pub. No.: WO2015/118686
PCT Pub. Date: Aug. 13, 2015

(65) Prior Publication Data
US 2016/0335536 A1    Nov. 17, 2016

(51) Int. Cl.
*G06N 3/08* (2006.01)
*G06N 3/04* (2006.01)

(52) U.S. Cl.
CPC ............ *G06N 3/08* (2013.01); *G06N 3/04* (2013.01); *G06N 3/0454* (2013.01)

(58) Field of Classification Search
CPC ...... G06N 3/08; G06N 3/0436; G06N 3/0454; G06Q 10/10
See application file for complete search history.

(56) References Cited

U.S. PATENT DOCUMENTS

2007/0067694 A1* 3/2007 Spencer ............. H03M 13/1148
714/752
2013/0318017 A1* 11/2013 Berrou ................. G06N 3/0445
706/16

FOREIGN PATENT DOCUMENTS

| JP | 2-50757 A | 2/1990 |
| JP | 9-91263 A | 4/1997 |
| JP | 2003-317073 A | 11/2003 |
| JP | 2006-163808 A | 6/2006 |
| JP | 2011-54200 A | 3/2011 |
| JP | 5234085 B2 | 7/2013 |

OTHER PUBLICATIONS

Ghosh et al., "Structural Adaptation and Generalization in Supervised Feed-Forward Networks", Journal of Artificial Neural Networks, vol. 1, No. 4, pp. 431-458, 1994 (Year: 1994).*
Karami et al. ("Multilayer Perceptron Neural Networks Decoder for LDPC Codes", 5th International Conference on Wireless Communications, Networking and Mobile Computing, 2009, pp. 1-4) (Year: 2009).*

(Continued)

*Primary Examiner* — Kakali Chaki
*Assistant Examiner* — Robert Lewis Kulp
(74) *Attorney, Agent, or Firm* — Birch, Stewart, Kolasch & Birch, LLP (57) ABSTRACT

Generating loosely coupled parts by forming couplings between partial nodes in a hierarchical neural network in accordance with a check matrix of an error correcting code.

6 Claims, 11 Drawing Sheets

(56) References Cited

OTHER PUBLICATIONS

Karami et al. ("Multilayer Perceptron Neural Networks Decoder for LDPC Codes", 5th International Conference on Wireless Communications, Networking and Mobile Computing, 2009, pp. 1-4) (Year: 2009).*
Zhu et al. ("Finite-Geometry Low-Density Parity-Check Codes for Channels with Stuck-at Defects", Proceedings, Canad. Workshop Inf. Theory, May 2005, pp. 1-4) (Year: 2005).*
Jian et al. ("Approaching Capacity at High Rates with Iterative Hard-Decision Decoding", 2012 IEEE International Symposium on Information Theory Proceedings, 2012, pp. 2696-2700) (Year: 2012).*
Hadi, "Linear Block Code Decoder Using Neural Network," 2008 International Joint Conference on Neural Networks (IJCNN 2008), Jun. 8, 2008, pp. 1111-1114.
Mizutani, "The New Weighting Method of Sparse Neural Network", Proceedings of Circuits and Systems, ISCAS '93, 1993 IEEE International Symposium on, May 6, 1993, 1993, pp. 2383-2386.
Ghosh et al., "Structural adaptation and generalization in supervised feed-forward networks," Journal of Artificial Neural Networks, vol. 1, No. 4, 1994, pp. 431-458 (pp. 1-30), XP055394848.
Le Cun et al., "Handwritten digit recognition with a back-propagation network," Advances in neural information processing systems, vol. 2, 1990, pp. 396-404 (9 pages total), XP055394851.
Liu et al., "Analysis and synthesis of a class of neural networks with sparse interconnections," 1993 IEEE International Symposium on Circuits and Systems, May 3, 1993, pp. 2596-2599, XP010115740.
Wan et al., "Regularization of Neural Networks using DropConnect," Proceedings of the 30th International Conference on Machine Learning, Atlanta, Georgia, USA, vol. 28, 2013, 9 pages.
Decision to refuse a European Patent application for European Application No. 14882049.1, dated Dec. 17, 2019.

* cited by examiner

Input Nodes

|  | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ | $x_{13}$ | $x_{14}$ | $x_{15}$ |
|---|---|---|---|---|---|---|---|---|---|---|---|---|---|---|---|
| $h_1$ | 1 | 0 | 1 | 0 | 0 | 0 | 0 | 0 | 1 | 1 | 0 | 0 | 0 | 0 | 0 |
| $h_2$ | 0 | 0 | 0 | 0 | 1 | 0 | 0 | 0 | 0 | 0 | 1 | 0 | 1 | 0 | 1 |
| $h_3$ | 0 | 0 | 0 | 1 | 0 | 0 | 1 | 1 | 0 | 0 | 0 | 0 | 0 | 1 | 0 |
| $h_4$ | 1 | 1 | 0 | 0 | 0 | 1 | 0 | 0 | 0 | 0 | 0 | 1 | 0 | 0 | 0 |
| $h_5$ | 0 | 0 | 1 | 0 | 0 | 0 | 0 | 0 | 1 | 1 | 0 | 1 | 0 | 0 | 0 |
| $h_6$ | 0 | 0 | 0 | 0 | 1 | 0 | 0 | 0 | 0 | 1 | 0 | 0 | 0 | 1 | 1 |
| $h_7$ | 0 | 0 | 0 | 1 | 0 | 0 | 1 | 1 | 0 | 0 | 0 | 1 | 0 | 0 | 0 |
| $h_8$ | 1 | 1 | 1 | 0 | 0 | 1 | 0 | 0 | 0 | 0 | 0 | 0 | 0 | 0 | 0 |
| $h_9$ | 0 | 0 | 0 | 0 | 1 | 0 | 0 | 0 | 1 | 1 | 0 | 0 | 1 | 0 | 0 |
| $h_{10}$ | 0 | 0 | 0 | 0 | 0 | 0 | 0 | 1 | 0 | 0 | 1 | 0 | 0 | 1 | 1 |
| $h_{11}$ | 0 | 1 | 0 | 1 | 0 | 0 | 1 | 0 | 0 | 0 | 0 | 1 | 0 | 0 | 0 |
| $h_{12}$ | 1 | 0 | 1 | 0 | 0 | 1 | 0 | 0 | 1 | 0 | 0 | 0 | 0 | 0 | 0 |
| $h_{13}$ | 0 | 0 | 0 | 0 | 1 | 0 | 0 | 0 | 0 | 1 | 0 | 0 | 1 | 0 | 1 |
| $h_{14}$ | 0 | 0 | 0 | 0 | 0 | 0 | 1 | 1 | 0 | 0 | 1 | 0 | 0 | 1 | 0 |
| $h_{15}$ | 0 | 1 | 0 | 1 | 0 | 1 | 0 | 0 | 0 | 0 | 0 | 1 | 0 | 0 | 0 |

Intermediate Nodes

FIG.6

| Number of Columns or Rows | Number of 1's | Ratio of 1's |
|---|---|---|
| 15 | 4 | 0.2667 |
| 63 | 8 | 0.1270 |
| 255 | 16 | 0.0627 |
| 1023 | 32 | 0.0313 |
| 4095 | 64 | 0.0156 |
| 16383 | 128 | 0.0078 |

FIG.7

| Number of Columns or Rows | Number of 1's | Ratio of 1's |
|---|---|---|
| 21 | 5 | 0.2381 |
| 73 | 9 | 0.1233 |
| 273 | 17 | 0.0623 |
| 1057 | 33 | 0.0312 |
| 4161 | 65 | 0.0156 |
| 16513 | 129 | 0.0078 |

FIG.8

| Number of Columns or Rows | Number of 1's | Ratio of 1's |
|---|---|---|
| 7 | 3 | 0.4286 |
| 21 | 5 | 0.2381 |
| 73 | 9 | 0.1233 |
| 273 | 17 | 0.0623 |
| 1057 | 33 | 0.0312 |

FIG.9

Input Nodes

|  | $x_1$ | $x_2$ | $x_3$ | $x_4$ | $x_5$ | $x_6$ | $x_7$ | $x_8$ | $x_9$ | $x_{10}$ | $x_{11}$ | $x_{12}$ | $x_{13}$ | $x_{14}$ | $x_{15}$ | $x_{16}$ | $x_{17}$ | $x_{18}$ |
|---|---|---|---|---|---|---|---|---|---|---|---|---|---|---|---|---|---|---|
| $h_1$ | 1 | 1 | 0 | 0 | 0 | 0 | 0 | 0 | 0 | 0 | 0 | 0 | 0 | 0 | 0 | 0 | 0 | 0 |
| $h_2$ | 1 | 1 | 1 | 1 | 0 | 0 | 0 | 0 | 0 | 0 | 0 | 0 | 0 | 0 | 0 | 0 | 0 | 0 |
| $h_3$ | 1 | 1 | 1 | 1 | 1 | 1 | 0 | 0 | 0 | 0 | 0 | 0 | 0 | 0 | 0 | 0 | 0 | 0 |
| $h_4$ | 1 | 1 | 1 | 1 | 1 | 1 | 1 | 1 | 0 | 0 | 0 | 0 | 0 | 0 | 0 | 0 | 0 | 0 |
| $h_5$ | 0 | 0 | 1 | 1 | 1 | 1 | 1 | 1 | 1 | 1 | 0 | 0 | 0 | 0 | 0 | 0 | 0 | 0 |
| $h_6$ | 0 | 0 | 0 | 0 | 1 | 1 | 1 | 1 | 1 | 1 | 1 | 1 | 0 | 0 | 0 | 0 | 0 | 0 |
| $h_7$ | 0 | 0 | 0 | 0 | 0 | 0 | 1 | 1 | 1 | 1 | 1 | 1 | 1 | 1 | 0 | 0 | 0 | 0 |
| $h_8$ | 0 | 0 | 0 | 0 | 0 | 0 | 0 | 1 | 1 | 1 | 1 | 1 | 1 | 1 | 1 | 0 | 0 | 0 |
| $h_9$ | 0 | 0 | 0 | 0 | 0 | 0 | 0 | 0 | 0 | 1 | 1 | 1 | 1 | 1 | 1 | 1 | 1 | 1 |
| $h_{10}$ | 0 | 0 | 0 | 0 | 0 | 0 | 0 | 0 | 0 | 0 | 1 | 1 | 1 | 1 | 1 | 1 | 1 | 1 |
| $h_{11}$ | 0 | 0 | 0 | 0 | 0 | 0 | 0 | 0 | 0 | 0 | 0 | 0 | 1 | 1 | 1 | 1 | 1 | 1 |
| $h_{12}$ | 0 | 0 | 0 | 0 | 0 | 0 | 0 | 0 | 0 | 0 | 0 | 0 | 0 | 0 | 0 | 0 | 1 | 1 |

Intermediate Nodes

FIG.10

|  | Number of Input Nodes and Intermediate Nodes | | |
|---|---|---|---|
|  | 50 | 100 | 1000 |
| Neural Network A | 2500 | 10000 | 1000000 |
| Neural Network B | 200 | 400 | 4000 |
| Reduction Rate | 2/25 | 1/25 | 1/250 |

HIERARCHICAL NEURAL NETWORK APPARATUS, CLASSIFIER LEARNING METHOD AND DISCRIMINATING METHOD

TECHNICAL FIELD

The present invention relates to a hierarchical neural network apparatus, a classifier learning method and a discriminating method.

BACKGROUND ART

As is well-known, a neural network has learning capacity, excels at nonlinearity and pattern matching capacity, and is used in a variety of fields such as control, a forecast, and diagnosis.

In addition, although various configurations have been proposed about neural networks, a greater number of neural networks put to practical application is hierarchical, and is almost three-layer hierarchical in particular. The hierarchical neural network usually learns by an algorithm referred to as backpropagation (error backpropagation), and an internal coupled state (weights between nodes) is adjusted. Thus, providing the same input data as the learning data will give nearly the same output as the learning data. In addition, providing nearly the same data as the learning data will give an output close to the learning data.

Handling a complex problem by a hierarchical neural network will increase the number of nodes of an intermediate layer or the number of intermediate layers, which presents a problem of increasing a computation amount. To solve the problem, examples have been known which reduce the computation amount by forming loose couplings between nodes. As typical Patent Documents, the following two documents are known.

A Patent Document 1 discloses a structure that forms a group of input nodes with similar features by using statistical indicators such as the maximum, minimum, mean, standard deviation of the learning data about a plurality of input nodes, or by using correlation coefficients between the input nodes of learning data or between the input and output, and that forms loosely coupled parts by coupling input nodes and intermediate nodes within the groups.

In addition, a neural network structure optimization method disclosed in a Patent Document 2 generates a plurality of neural networks with different structures by eliminating couplings between arbitrary nodes, and computes evaluation values of the individual neural networks, followed by comparison and decision of the evaluation values to alter to a neural network with the optimum structure.

PRIOR ART DOCUMENT

Patent Document

Patent Document 1: Japanese Patent Laid-Open No. 2011-54200.
Patent Document 2: Japanese Patent Laid-Open No. 91263/1997.

DISCLOSURE OF THE INVENTION

Problems to be Solved by the Invention

The conventional techniques typified by the Patent Documents 1 and 2 require pre-learning to form loose couplings before carrying out classifier learning, and have to perform pre-learning every time the learning data is altered or corrected, which requires a lot of time and computation amount to form the loose couplings. Accordingly, it has a problem of being unable to speed up the classifier learning and discriminating processing.

The present invention is implemented to solve the foregoing problems. Therefore it is an object of the present invention to provide a hierarchical network apparatus, classifier learning method and discriminating method capable of speeding up the classifier learning and discriminating processing by forming loose couplings independently of the learning data in a hierarchical neural network.

Means for Solving the Problems

A hierarchical neural network apparatus in accordance with the present invention comprises: a weight learning unit to generate loosely coupled parts by forming couplings between partial nodes in a hierarchical neural network in accordance with a check matrix of an error correcting code, and to learn weights between the nodes coupled, the hierarchical neural network comprising an input layer, intermediate layer and output layer, each of the layers comprising nodes; and a discriminating processor to solve a classification problem or a regression problem using the hierarchical neural network whose weights between the nodes coupled are updated by weight values learned by the weight learning unit.

Advantages of the Invention

According to the present invention, forming the loose couplings independently of the learning data in the hierarchical neural network offers an advantage of being able to speed up the classifier learning and discriminating processing.

DESCRIPTION OF EMBODIMENTS

The embodiments of the invention will now be described with reference to the accompanying drawings to explain the present invention in more detail.

Embodiment 1

Figure 1:
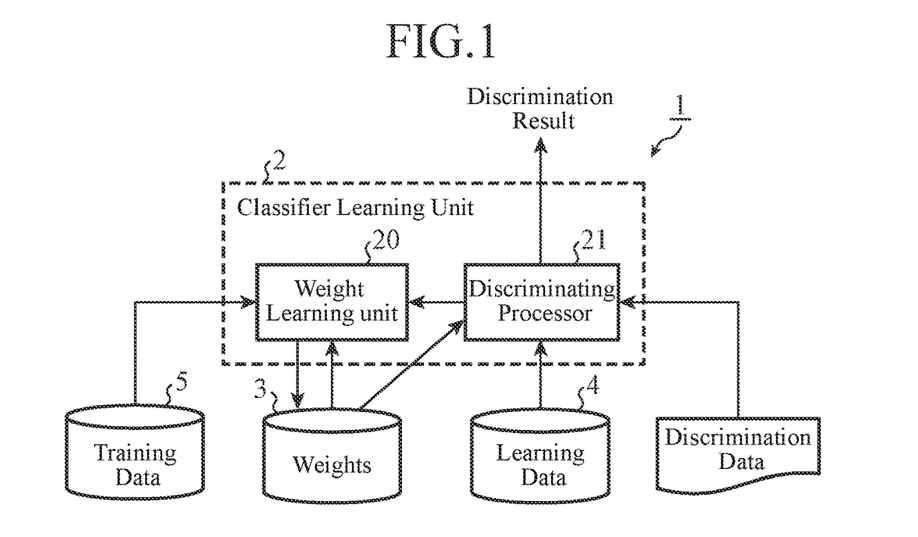
FIG. 1 is a block diagram showing a configuration of a hierarchical neural network apparatus of an embodiment 1 in accordance with the present invention.

FIG. 1 is a block diagram showing a configuration of a hierarchical neural network apparatus of an embodiment 1 in accordance with the present invention. In FIG. 1, the hierarchical neural network apparatus 1, which is a device that makes a discrimination using a hierarchical neural network, is comprised of a classifier learning unit 2, a weight storage 3, a learning data storage 4 and a training data storage 5.

Incidentally, the hierarchical neural network comprises an input layer, an intermediate layer and an output layer, each of which has a plurality of nodes. In addition, the hierarchical neural network functions as a classifier capable of solving various problems (classification problem or regression problem) by adjusting coupled states between nodes by setting arbitrary weights between the nodes of the input layer and the intermediate layer, and between the nodes of the intermediate layer and the output layer.

The classifier learning unit 2 learns the hierarchical neural network, and makes a discrimination using the hierarchical neural network it learns. It comprises as its components a weight learning unit 20 and a discriminating processor 21.

The weight learning unit 20 generates loosely coupled parts by forming couplings between partial nodes in the hierarchical neural network in accordance with a check matrix of an error correcting code, and learns weights between the nodes coupled. More specifically, receiving a discrimination result output from the discriminating processor 21, weights between the nodes (weights of classifiers) read out of the weight storage 3 and training data read out of the training data storage 5, the weight learning unit 20 performs weight learning using these data.

In addition, the weight learning unit 20 assigns nodes of one of the layers to row elements of the check matrix of the error correcting code, assigns nodes of the other of the layers to column elements, couples between the nodes corresponding to a matrix element 1, but does not couple between the nodes corresponding to a matrix element 0. Thus, it can generate loosely coupled parts between the nodes without using the learning data.

The discriminating processor 21 solves the classification problem or regression problem using the hierarchical neural network whose weights between the nodes coupled are updated by the weight values learned by the weight learning unit 20. For example, when the discriminating processor 21 receives initialized weights or weights during learning from the weight storage 3 and receives the learning data from the learning data storage 4, it outputs a discrimination result using them to the weight learning unit 20. In addition, the discriminating processor 21, receiving the weights that have already been learned from the weight storage 3 and receiving the discrimination data, outputs a discrimination result obtained by using them to an external transfer device such as a display.

The discriminating processor 21 receives as its input signal the learning data or discrimination data between a node of the input layer and a node of the intermediate layer in the hierarchical neural network, and multiplies the input signal by the weight between the nodes. The multiplication results are summed up with respect to each node of the intermediate layer, and the sum undergoes computation through a threshold function and is output. Here, denoting the threshold function by f( ) the output value of the threshold function of the jth node of the intermediate layer by $H_j$, the input signal to the ith node of the input layer by $X_i$, and the weight between the ith node of the input layer and the jth node of the intermediate layer by $W_{ji}$, the output value of the threshold function $H_j$ is given by the following Expression (1).

$$H_j = f(\Sigma X_i W_{ji}) \tag{1}$$

In addition, the discriminating processor 21 employs as its input signal the output signal computed by the threshold function between a node of the intermediate layer and a node of the output layer, and multiplies the input signal by the weight between the nodes. The multiplication results are summed up with respect to each node of the output layer, and the sum undergoes computation by a threshold function, and is output as the discrimination result. Here, when denoting the output value of the threshold function of a kth node of the output layer by $O_k$, and a weight between the jth node of the intermediate layer and the kth node of the output layer by $W_{kj}$, then the output value of the threshold function $O_k$ can be given by the following Expression (2). Here, as the threshold function f( ) there are a sigmoid function, tank function, max function and the like. In addition, multiplication of the weights between the nodes is performed only for the parts having couplings between the nodes.

$$O_k = f(\Sigma X_j W_{kj}) \tag{2}$$

The weight storage 3 is a storage for storing the weights between the nodes in the hierarchical neural network. The weight storage 3 stores initial values of all the weights between the nodes of the hierarchical neural network at the initialization processing of the weights, and stores weight learning values between the nodes coupled at the creation of the loose couplings. The discriminating processor 21 constructs the hierarchical neural network by reading out the weight values of the nodes and the weight values between the nodes from the weight storage 3, and solves a classification problem or regression problem using the hierarchical neural network.

The learning data storage 4 is a storage for storing the learning data. The learning data is data that indicates state information for discriminating between normal and abnormal states in advance, and indicates a feature value. As for the learning data, there is a case where training data is known (supervised learning) and a case where training data desirable for the discrimination data is unknown (unsupervised learning).

The training data storage 5 is a storage for storing the training data. The training data is output data desirable for the discrimination data. The discrimination data is also discrimination target data.

Incidentally, the weight learning unit 20 and the discriminating processor 21 can be implemented as a concrete means in which hardware cooperates with software through a microcomputer that executes programs describing the processing special to the present embodiment 1, for example.

The weight storage 3, learning data storage 4 and training data storage 5 are constructed on at least one of a hard disk drive (HDD), USB memory, and storage medium (CD, DVD, BD) reproducible by a storage medium reproducing device, which are mounted on the computer functioning as the hierarchical neural network apparatus 1.

Figure 2:
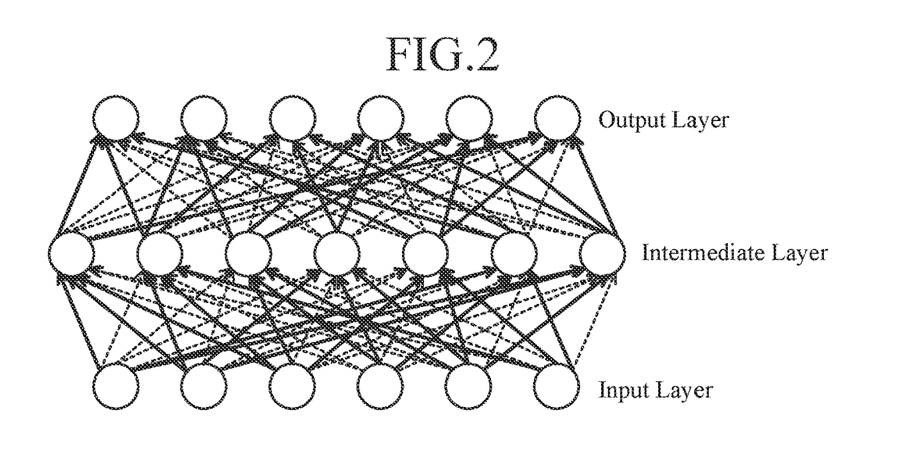
FIG. 2 is a diagram showing a structure of the hierarchical neural network in the embodiment 1.
Figure 3:
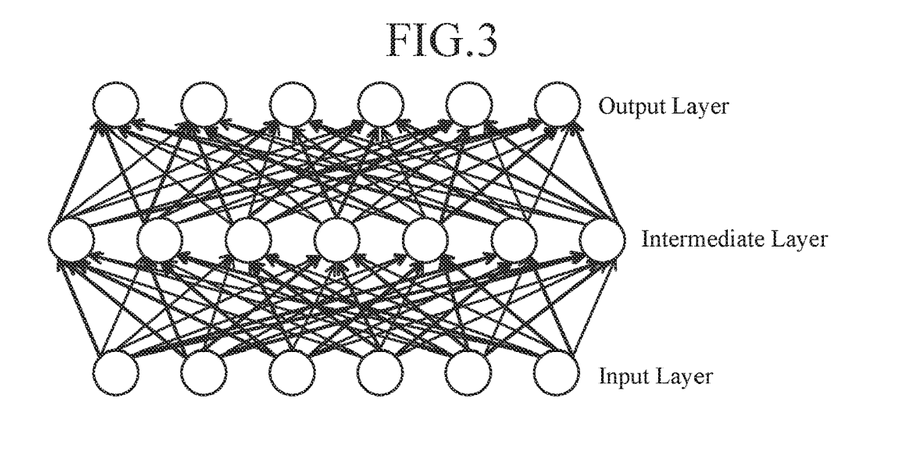
FIG. 3 is a diagram showing a structure of a conventional hierarchical neural network.

FIG. 2 is a diagram showing a structure of the hierarchical neural network in the embodiment 1, and FIG. 3 is a diagram showing a structure of a conventional hierarchical neural network. As shown in FIG. 3, in the conventional hierarchical neural network, all the nodes of the input layer are coupled with all the nodes of the intermediate layer, and all the nodes of the intermediate layer are coupled with all the nodes of the output layer. In contrast with this, in the embodiment 1, as shown in FIG. 2, loosely coupled parts are formed at least one set of couplings of the set of couplings between the nodes of the input layer and the nodes of the intermediate layer and the set of couplings between the nodes of the intermediate layer and the nodes of the output layer.

Next, the operation will be described.

Figure 4:
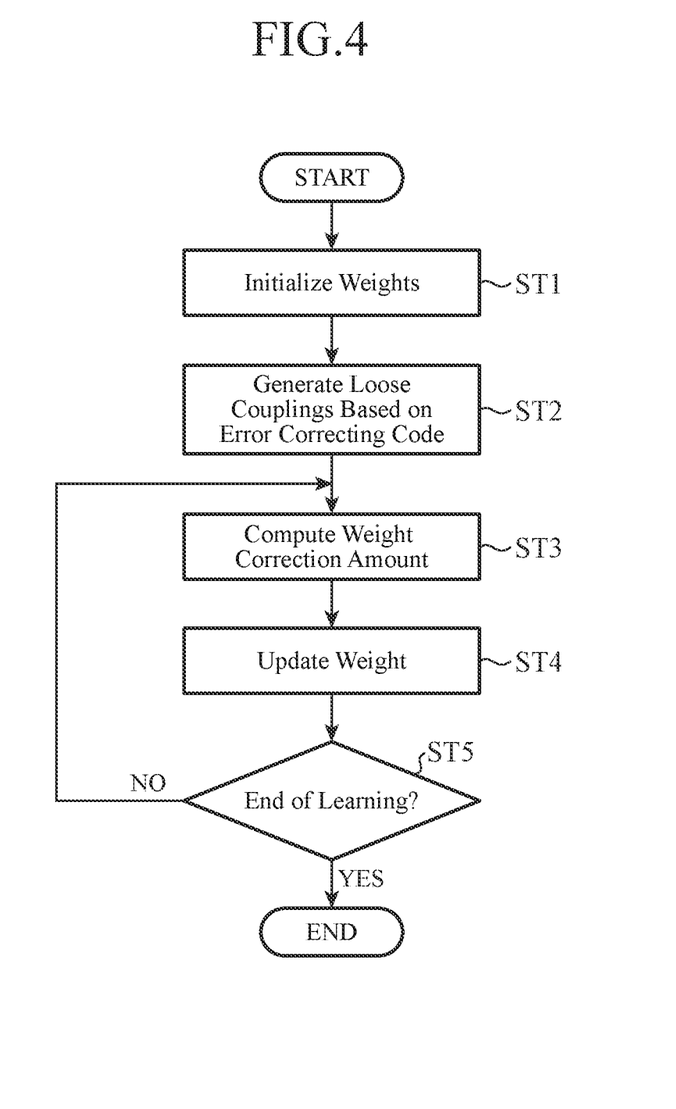
FIG. 4 is a flowchart showing weight learning processing in the embodiment 1.

FIG. 4 is a flowchart showing weight learning processing in the embodiment 1. Details of the weight learning by the weight learning unit 20 will be described with reference to FIG. 4.

First, the weight learning unit 20 initializes all the weights between the nodes in the respective layers of the hierarchical neural network (step ST1). More specifically, it assigns initial values consisting of random numbers from −0.5 to +0.5 to all the weights between the nodes in the respective layers.

Next, the weight learning unit 20 generates loose couplings by forming couplings only between partial nodes in the hierarchical neural network in accordance with the check matrix of the error correcting code (step ST2). As the check matrix of the error correcting code, a loose matrix is supposed which can equalize or reduce a learning error as compared with a general hierarchical neural network. For example, one of the pseudorandom number code, finite geometry code, cyclic code, pseudo-cyclic code, low-density parity-check (LDPC) code and spatially-coupled code can be used.

After that, the weight learning unit 20 computes correction values of the weights between the nodes coupled in the loosely coupled parts so as to reduce a value of an evaluation function for evaluating a learning error (step ST3).

Incidentally, the evaluation function J can be given by the following Expression (3), for example. Here, o denotes the output signal of a node, and t denotes the training data.

$$J = \tfrac{1}{2} * (o-t)^2 \qquad (3)$$

After that, the weight learning unit 20 updates the weights between the nodes coupled from their previous values using the correction values it obtains at step ST3 (step ST4).

After completing the update of the weights between the nodes, the weight learning unit 20 confirms whether an end condition of the weight learning is satisfied or not (step ST5). Here, it is conceivable as the end condition, for example, that the value of the evaluation function for computing the error between the training data and the discrimination result received from the discriminating processor 21 becomes equal to or less than a predetermined threshold. In addition, the end condition may be a case where the learning frequency becomes equal to or greater than a threshold.

If the weight learning unit 20 decides that the end condition is satisfied, and so the weight learning is to be closed (YES at step ST5), it terminates the weight learning. On the other hand, unless the end condition is satisfied (NO at step ST5), it returns to the processing at step ST3 to repeat the weight learning described above.

Thus, the discriminating processor 21 can solve the classification problem or regression problem using the hierarchical neural network whose weights between the nodes coupled in the loosely coupled parts are updated by the weight values the weight learning unit 20 learns.

Figure 5:
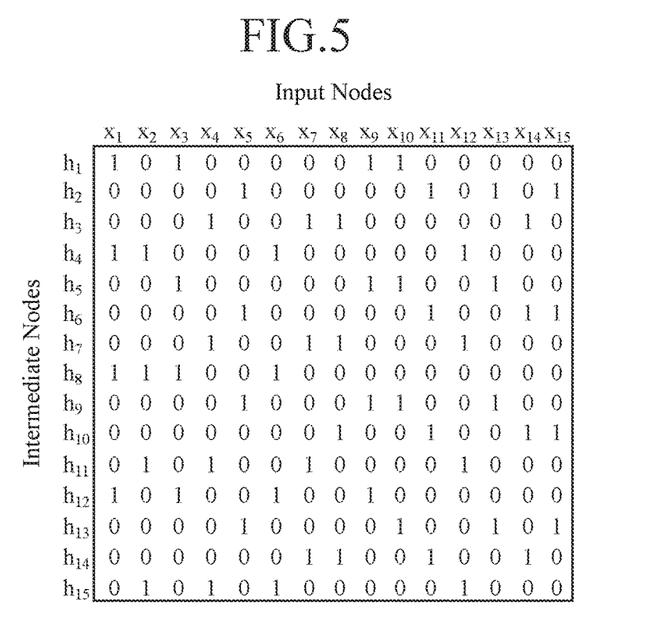
FIG. 5 is a diagram illustrating a check matrix of a pseudorandom number code.

Next, referring to the check matrix of a pseudorandom number code shown in FIG. 5, an example will be described which generates loosely coupled parts between the nodes of the input layer and the nodes of the intermediate layer. The matrix of FIG. 5 is a 15*15 matrix in which each row and each column have four 1's. It shows that there are 15 nodes of the input layer (referred to as "input nodes" from now on) $x_1, x_2, \ldots, x_{15}$ assigned to the elements of each column, and 15 nodes of the intermediate layer (referred to as "intermediate nodes" from now on) $h_1, h_2, \ldots, h_{15}$ assigned to the elements of each row, and that matrix elements with a value 1 indicate a part coupled, and one intermediate node has four input nodes coupled with it. For example, the intermediate node $h_1$ is coupled with the input nodes $x_1, x_3, x_9,$ and $x_{10}$ whose matrix elements are 1.

Figure 6:
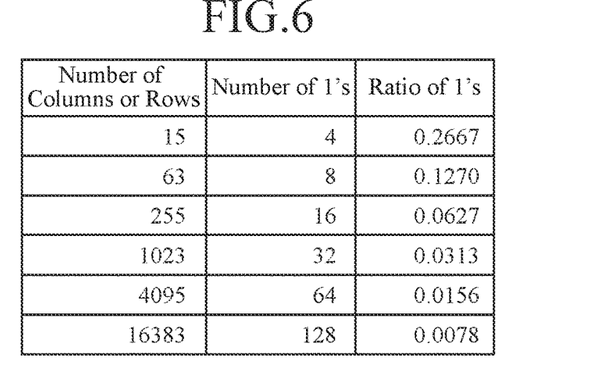
FIG. 6 is a table showing the number of 1's and the rate of 1's for the number of rows or the number of columns of a check matrix of a Euclidean geometry code.
Figure 7:
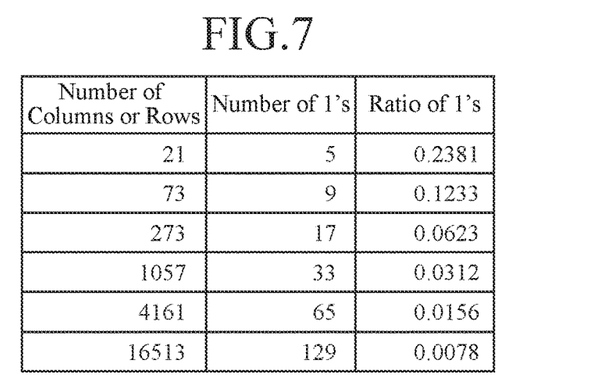
FIG. 7 is a table showing the number of 1's and the rate of 1's for the number of rows or the number of columns of a check matrix of a projective geometry code.
Figure 8:
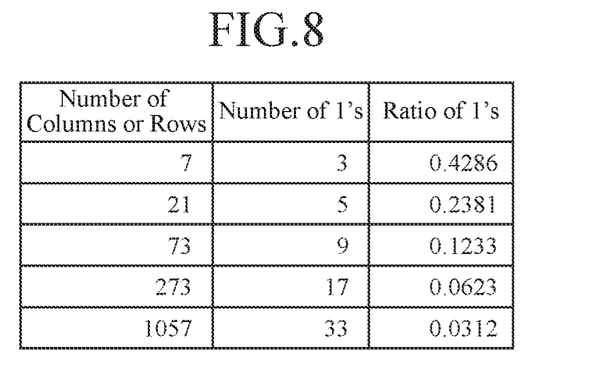
FIG. 8 is a table showing the number of 1's and the rate of 1's for the number of rows or the number of columns of a check matrix of a difference set cyclic code.

When the number of the intermediate nodes or output nodes (nodes of the output layer) is low (equal to or less than 21, for example), it is expected that the calculation amount can be reduced sharply by making couplings between the nodes corresponding to the matrix elements of 1 as described above on the basis of a check matrix of a finite geometry code such as a Euclidean geometry code or projective geometry code, or a check matrix of a cyclic code such as a difference set cyclic code. This is because as is clearly seen from a result of the number of 1's with respect to the number of columns or the number of rows in the check matrix of a Euclidean geometry code shown in FIG. 6, in the check matrix of a projective geometry code shown in FIG. 7, and in the check matrix of a difference set cyclic code shown in FIG. 8, when the number of columns or the number of rows corresponding to the number of nodes is not greater than 21, the number of 1's is much fewer than the number of columns or the number of rows and the loosely coupled parts can be formed between the nodes.

Incidentally, a cyclic code is a code generated by a cyclic shift of a code word, and has a regular arrangement. For this reason, it is suitable for the learning discrimination of time-series data, and when implemented in hardware, it is characterized by facilitating the design as compared with the other codes.

Figure 9:
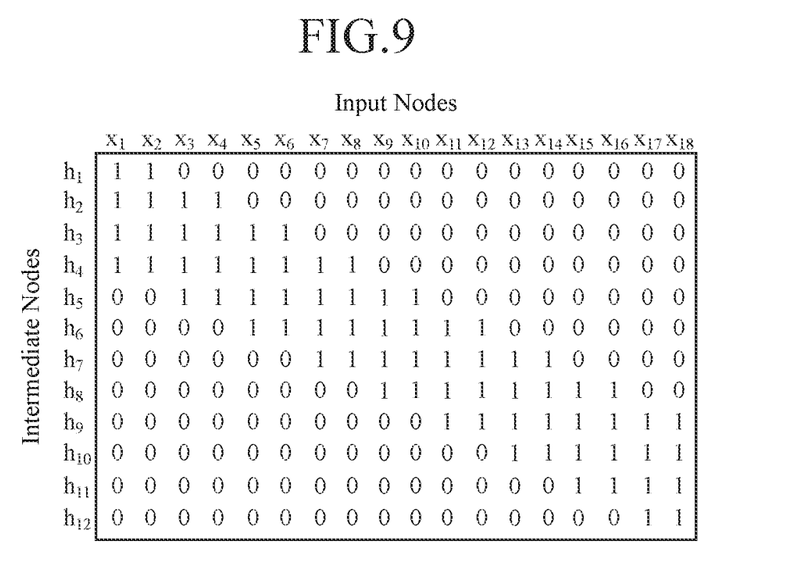
FIG. 9 is a diagram illustrating a check matrix of a spatially-coupled code.

In addition, when the number of the intermediate nodes or output nodes is high (more than 21, for example), it is expected that the calculation amount can be reduced sharply by making couplings between the nodes on the basis of one of a check matrix of an LDPC code, a check matrix of a spatially-coupled code, and a check matrix of a pseudo-cyclic code. This is because in the check matrix of the LDPC code, spatially-coupled code or pseudo-cyclic code, the number of 1's contained in a row or the number of 1's contained in a column averages out at three to six independently of the number of rows or the number of columns. For example, even if setting the number of rows at 10000, the number of 1's contained in a row averages out at three to six, and the number of couplings between the nodes averages out at three to six, thus forming loose couplings. Accordingly, it can reduce the calculation amount sharply. In particular, since the check matrix of a spatially-coupled code shown in FIG. 9 is a matrix with 1's arranged in a band, a maximum reduction in the calculation amount can be expected from the view point of facilitating the control.

As described above, making the loose couplings between the nodes based on the check matrix of an error correcting code enables the classifier learning and discriminating processing to be performed at high speed while maintaining the discrimination performance.

Figure 10:
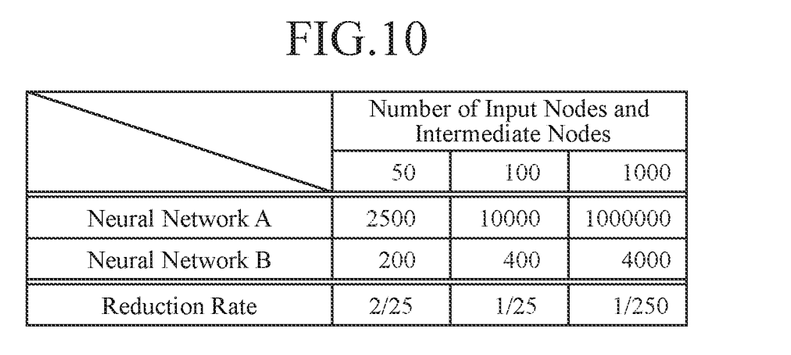
FIG. 10 is a table showing a number of couplings between input nodes and intermediate nodes in neural networks A and B.

FIG. 10 is a diagram illustrating the number of couplings between the input nodes and intermediate nodes in neural networks A and B. In FIG. 10, the neural network A is an ordinary hierarchical neural network with the couplings formed between all the nodes, and the neural network B is a hierarchical neural network with the loose couplings formed between the nodes in accordance with the present invention.

As for the neural network B, an example is shown in which four input nodes are coupled with one intermediate node. As shown, the embodiment 1 can reduce the number of couplings to $\frac{2}{25}$, $\frac{1}{25}$ and $\frac{1}{250}$ as compared with the neural network A when the number of the input node and that of the intermediate node are each 50, 100 and 1000, respectively. As a result, it can reduce the product-sum operation between the input nodes and the intermediate nodes, thereby being able to speed up the classifier learning and discriminating processing.

In addition, since it generates the loose couplings independently of the learning data, even if the learning data is changed or corrected, it can save time and effort for pre-learning.

As described above, according to the present embodiment 1, it comprises the weight learning unit 20 to generate the loosely coupled parts by forming couplings between the partial nodes in the hierarchical neural network comprising the input layer, the intermediate layer and the output layer, each of the layers comprising nodes, in accordance with the check matrix of an error correcting code, and to learn weights between the nodes coupled; and the discriminating processor 21 to solve a classification problem or a regression problem using the hierarchical neural network whose weights between the nodes coupled are updated by the weight values learned by the weight learning unit 20. Thus forming the loose couplings in the hierarchical neural network independently of the learning data makes it possible to speed up the classifier learning and discriminating processing.

Embodiment 2

The foregoing embodiment 1 shows the instance which speeds up the classifier learning and discriminating processing using an ordinary 3-level hierarchical neural network. In the present embodiment 2 which is a developed application of the hierarchical neural network, an instance will be described which speeds up the classifier learning and discriminating processing using a deep neural network, which has been attracting a great deal of attention recently.

Figure 11:
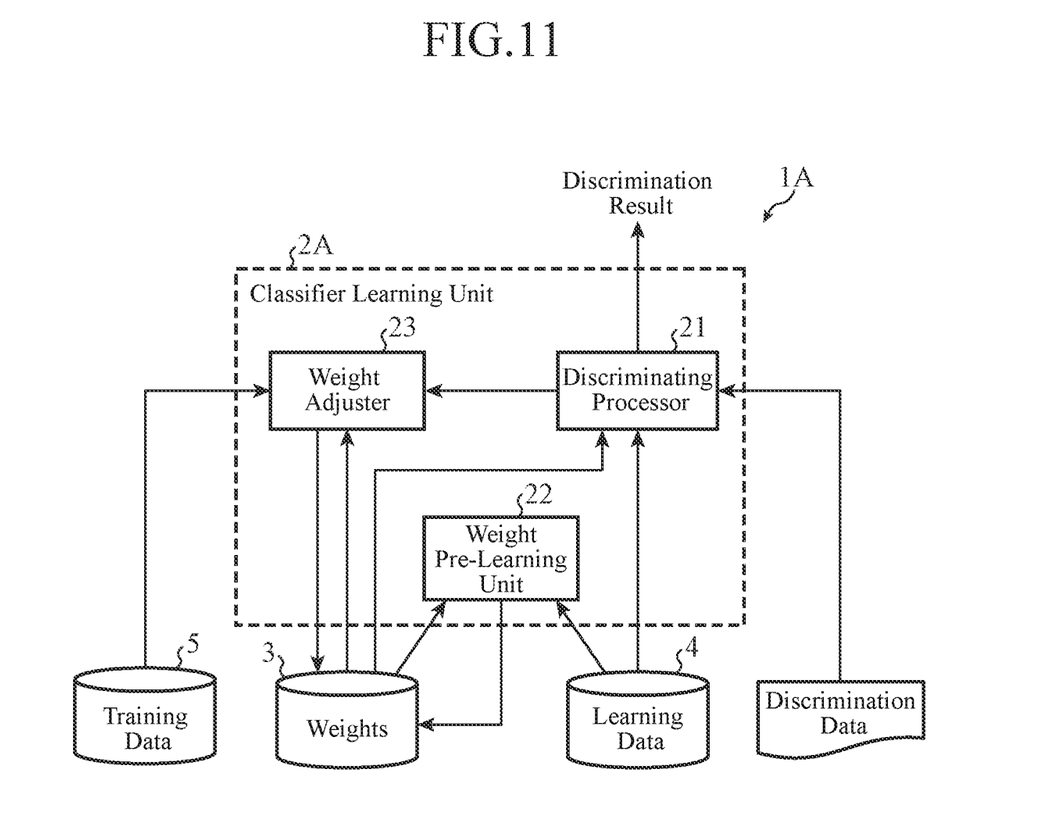
FIG. 11 is a block diagram showing a configuration of a hierarchical neural network apparatus of an embodiment 2 in accordance with the present invention.

FIG. 11 is a block diagram showing a configuration of a hierarchical neural network apparatus of the embodiment 2 in accordance with the present invention. The hierarchical neural network apparatus 1A shown in FIG. 11, which is a device for solving the classification problem or regression problem using a deep neural network, comprises a classifier learning unit 2A, the weight storage 3, the learning data storage 4 and the training data storage 5. The deep neural network is comprising an input layer, a plurality of intermediate layers and an output layer, and each layer has a plurality of nodes. In addition, the deep neural network functions as a classifier capable of solving various problems (classification problem or regression problem) by adjusting a coupled state between the nodes by setting arbitrary weights between the nodes of the input layer and the nodes of the intermediate layer and between the nodes of the intermediate layer and the nodes of the output layer.

Figure 12:
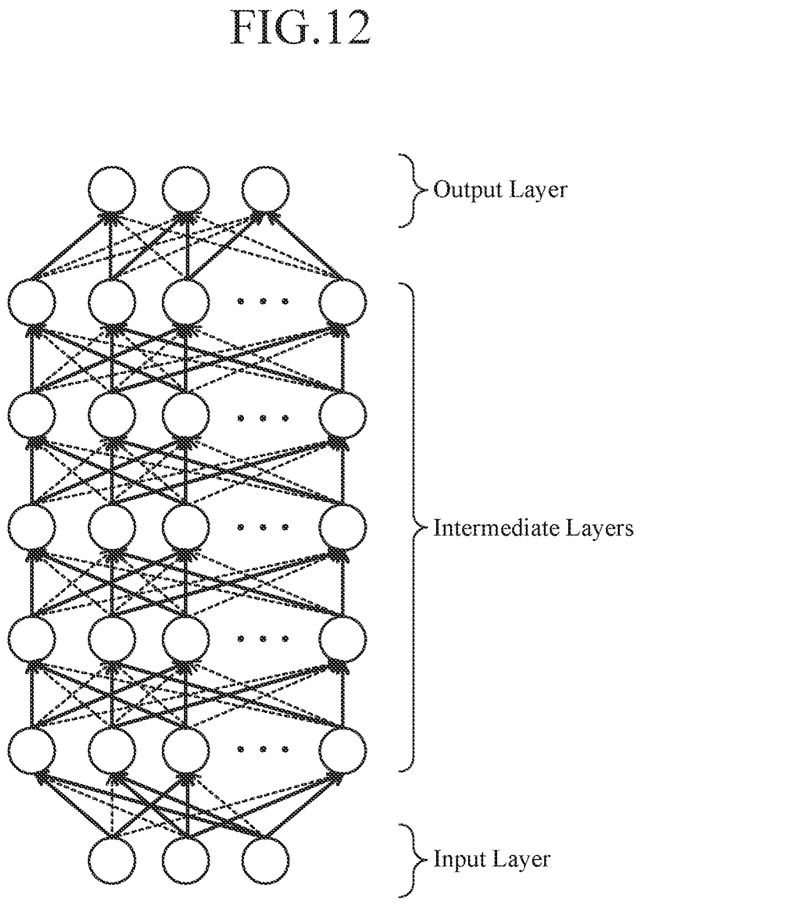
FIG. 12 is a diagram showing a structure of a deep neural network in the embodiment 2.
Figure 13:
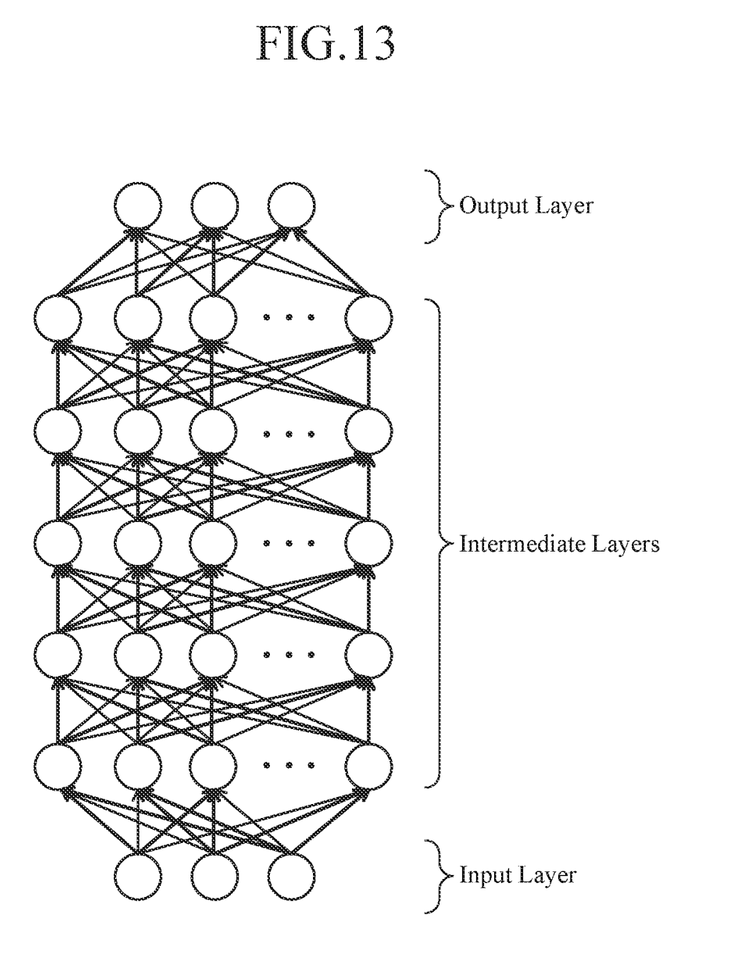
FIG. 13 is a diagram showing a structure of a conventional deep neural network.

FIG. 12 is a diagram showing a structure of the deep neural network in the embodiment 2; and FIG. 13 is a diagram showing a structure of a conventional deep neural network. As shown in FIG. 13, in the conventional deep neural network, all the nodes are coupled between the input layer and the intermediate layer, and all the nodes are coupled between the adjacent intermediate layers, and all the nodes are coupled between the intermediate layer and the output layer. In contrast with this, in the embodiment 2, as shown in FIG. 12, as for the couplings between the nodes of the input layer and the intermediate layer, the couplings between the nodes of the adjacent intermediate layers, and the couplings between the nodes of the intermediate layer and the output layer, loosely coupled parts are formed at least one of them.

The classifier learning unit 2A learns a deep neural network, and solves a classification problem or a regression problem using the deep neural network it learns. As its components, it comprises the discriminating processor 21, a weight pre-learning unit 22 and a weight adjuster 23.

The weight pre-learning unit 22 generates loosely coupled parts by forming couplings between partial nodes in a deep neural network in accordance with a check matrix of an error correcting code, and performs unsupervised learning of the weights between the nodes coupled. For example, the weight pre-learning unit 22, receiving initialized weights between the nodes and learning data, performs pre-learning of the weights.

In addition, the weight pre-learning unit 22 assigns nodes of one of the layers to the row elements of the check matrix of the error correcting code, assigns nodes of another of the layers to the column elements, couples between the nodes corresponding to a matrix element 1, but does not couple between the nodes corresponding to a matrix element 0. Thus, it can generate loosely coupled parts between the nodes without using learning data.

Using the supervised learning, the weight adjuster 23 performs a fine tuning of the weights the weight pre-learning unit 22 learns. Thus, the weight adjuster 23 finely tunes the weights for only between the nodes coupled.

When the discriminating processor 21 of the embodiment 2 receives the weights that have passed through the pre-learning or weights during learning from the weight storage 3, and the learning data from the learning data storage 4, it outputs a discrimination result of using them to the weight adjuster 23. In addition, when the discriminating processor 21 receives the weights that have already been learned from the weight storage 3 and receives the discrimination data, it outputs a discrimination result of using them to an external transfer device such as a display.

The discriminating processor 21 receives as its input signal the learning data or discrimination data between a node of the input layer and a node of the first intermediate layer in the deep neural network, and multiplies the input signal by the weight between the nodes. The multiplication results are summed up with respect to each node of the first intermediate layer and the sum undergoes computation through a threshold function and is output. Here, denoting the threshold function by f( ) the output value of the threshold function of the jth node of the first intermediate layer by $H_{1,j}$, the input signal to the ith input node by $X_i$, and the weight between the ith input node and the jth intermediate node of the first intermediate layer by $W_{1,j,i}$, the output value of the threshold function $H_{1,j}$ is given by the following Expression (4).

$$H_{1,j}=f(\Sigma X_1 W_{1,j,i}) \quad (4)$$

In addition, as for a jth intermediate node of an (n−1)th intermediate layer (n is an integer not less than two) and an mth intermediate node of the nth intermediate layer, the discriminating processor 21 receives as its input signal the output signal computed by the threshold function of the (n−1)th intermediate node, and multiplies the input signal by the weight between the nodes. The multiplication results are summed up with respect to each intermediate node of the nth intermediate layer, and the sum undergoes computation through the threshold function and is output. Here, denoting the output value of the threshold function of the jth intermediate node of the (n−1)th intermediate layer by $H_{n-1,j}$, the output value of the threshold function of the mth intermediate node of the nth intermediate layer by $H_{n,m}$, and the weight between the jth intermediate node of the (n−1)th intermediate layer and the mth intermediate node of the nth intermediate layer by $W_{n,m,n-1,j}$, the output value of the threshold function $H_{n,m}$ is given by the following Expression (5).

$$H_{n,n}=f(\Sigma H_{n-1,j}W_{n,m,n-1,j}) \quad (5)$$

As for the intermediate node and the output node, the discriminating processor 21 receives as its input signal the output signal computed by the threshold function of the intermediate node, and multiplies the input signal by the weight between the nodes. The multiplication results are summed up with respect to each output node of the output layer, and the sum undergoes computation through the threshold function and is output as the discrimination result.

Here, denoting the output value of the threshold function of the kth output node of the output layer by $O_k$, and the weight between the jth intermediate node of the (N−1)th intermediate layer and the kth output node of the output layer by $W_{k,N-1,j}$, then the output value $O_k$ of the threshold function is given by the following Expression (6).

As the threshold function f( ) a sigmoid function, a tanh function, a max function or the like is possible. In addition, the multiplication of the weight between the nodes is carried out only for the portions having couplings between the nodes.

$$O_k=f(\Sigma H_{N-1,j}W_{k,N-1,j}) \quad (6)$$

Incidentally, the discriminating processor 21, the weight pre-learning unit 22 and the weight adjuster 23 can be implemented as a concrete means in which hardware cooperates with software through a microcomputer that executes programs describing the processing special to the present embodiment 2, for example.

Next, the operation will be described.

Figure 14:
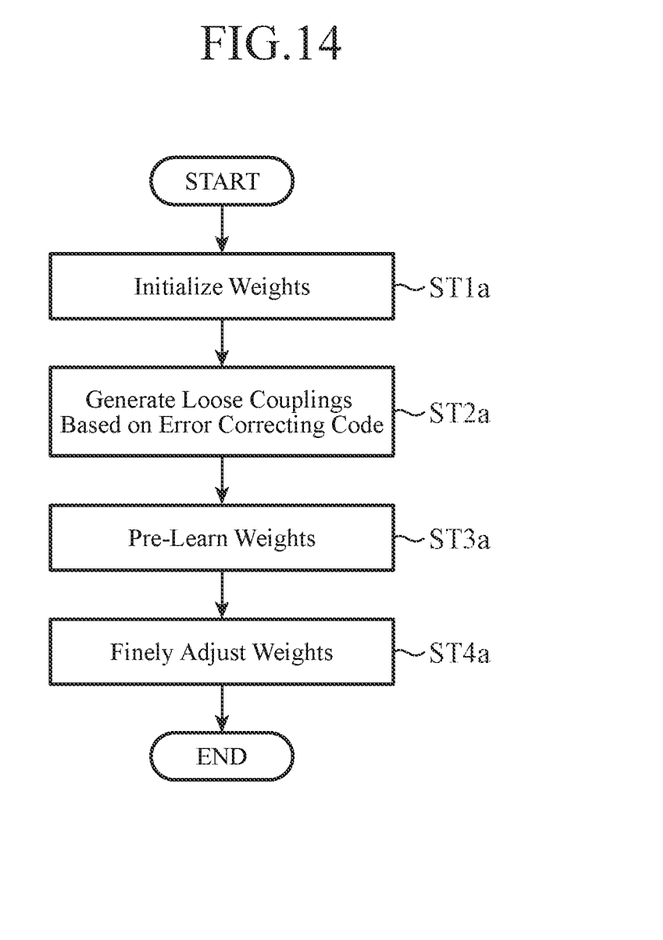
FIG. 14 is a flowchart showing weight learning processing by pre-learning and adjustment of weights in the embodiment 2.

FIG. 14 is a flowchart showing the weight learning processing in the embodiment 2.

First, the weight pre-learning unit 22 initializes all the weights between the nodes in the respective layers of the deep neural network (step ST1a). More specifically, as in the embodiment 1, it assigns initial values consisting of random numbers from −0.5 to +0.5 to all the weights between the nodes in the respective layers.

Next, the weight pre-learning unit 22 generates loose couplings by forming couplings between partial nodes in the deep neural network in accordance with the check matrix of the error correcting code (step ST2a). As the check matrix of the error correcting code, a loose matrix is supposed which can equalize or reduce the learning error as compared with a general deep neural network. For example, one of the pseudorandom number code, finite geometry code, cyclic code, pseudo-cyclic code, LDPC code and spatially-coupled code can be used.

Figure 15:
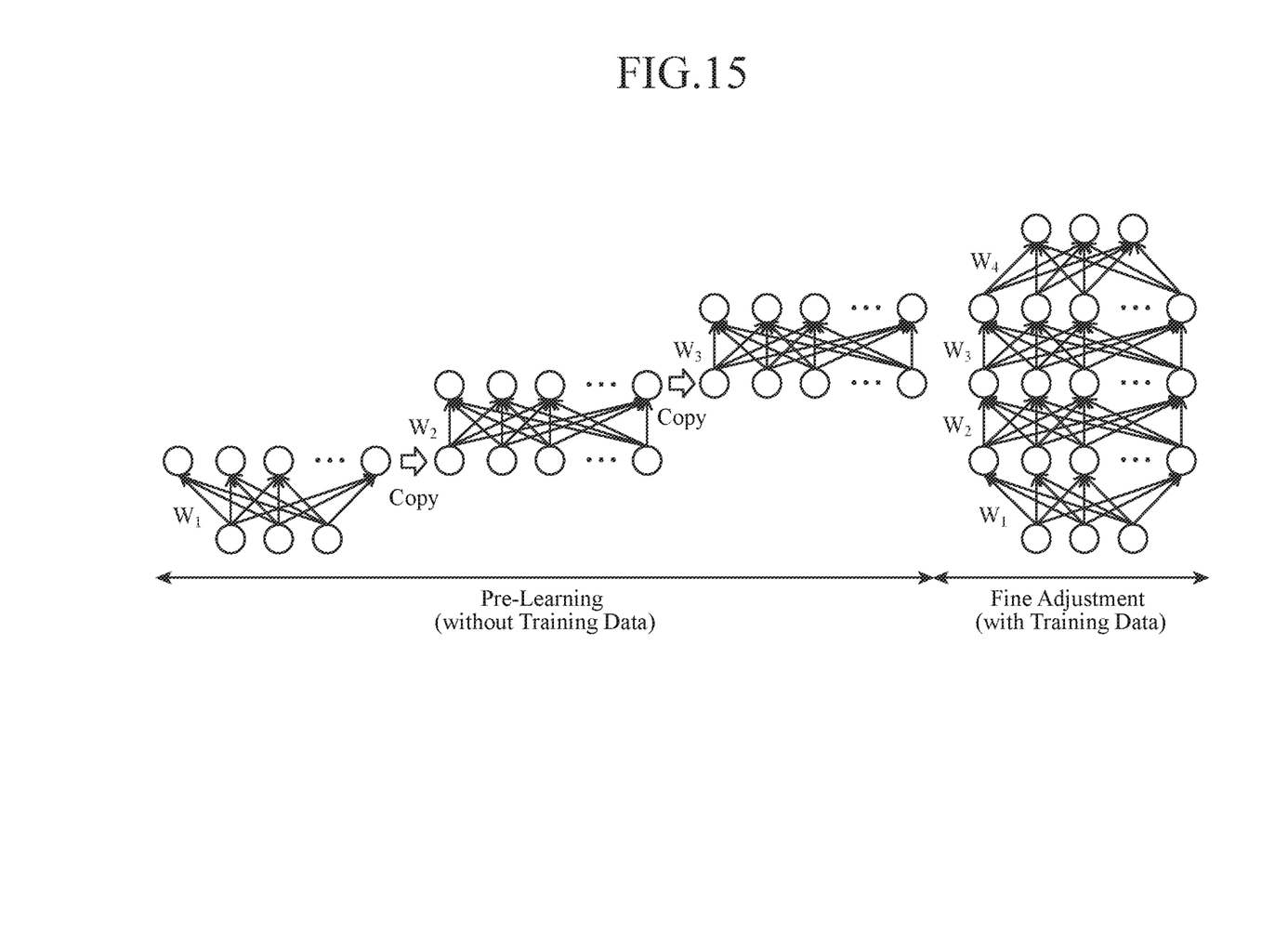
FIG. 15 is a diagram illustrating an outline of the weight learning processing by the pre-learning and adjustment of the weights when N=5.

After that, as shown in FIG. 15, assuming that the deep neural network has N layers (N is an integer), the weight pre-learning unit 22 performs pre-learning of the weights ($W_1$, $W_2$, . . . , $W_{N-2}$) between the nodes having couplings up to the (N−1)th layer (step ST3a).

In the pre-learning, the weight pre-learning unit 22 performs unsupervised learning of the weight $W_1$ between the nodes of the first layer and the nodes of the second layer in the two-layer structure of the first layer and the second layer, first. Next, it carries out the unsupervised learning of the weight $W_2$ between the nodes of the second layer and the nodes of the third layer in the two-layer structure of the second layer and the third layer by using as the input signals the signals output from the nodes of the second layer by the unsupervised learning of the weight $W_1$. The weight pre-learning unit 22 repeats the processing until the weight $W_{N-2}$ between the nodes of the (N−2)th layer and the nodes of the (N−1)th layer is pre-learned (see FIG. 15, which assumes that N=5).

Figure 16:
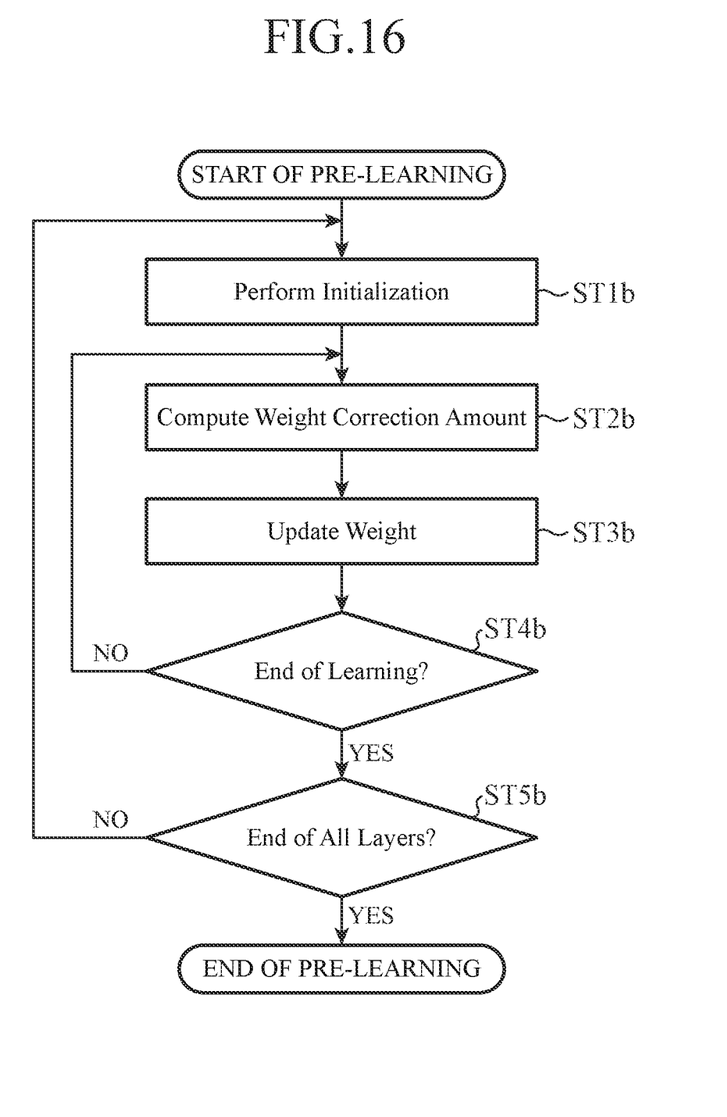
FIG. 16 is a flowchart showing the pre-learning processing of the weights.

Referring to FIG. 16, details of the pre-learning of the weights will be described.

First, when performing the pre-learning of the weight between the nodes of the second layer and the nodes of the third layer on and after, the weight pre-learning unit 22 initializes the input signal to the signal output from the previous pre-learning (step ST1b). Next, the weight pre-learning unit 22 computes the correction value of the weight between the nodes coupled so as to increase the logarithmic likelihood (step ST2b).

After that, the weight pre-learning unit 22 updates and corrects the weight value between the nodes coupled by the correction value of the weight it computes (step ST3b).

After the update of the weight between the nodes, the weight pre-learning unit 22 confirms whether the weight pre-learning in the present learning target layer satisfies its end condition or not (step ST4b). Here, as the end condition, it is conceivable that the number of times of the learning becomes equal to or greater than a threshold.

When the weight pre-learning unit 22 decides that the end condition of the present learning target layer is satisfied and the weight pre-learning is to be terminated (YES at step ST4b), it proceeds to the processing at step ST5b.

On the other hand, unless it decides that the end condition is satisfied (NO at step ST4b), it returns to the processing at step ST2b and repeats the weight pre-learning described above.

At step ST5b, the weight pre-learning unit 22 confirms whether or not the pre-learning of the weight between the nodes coupled has been completed for all the layers up to the (N−1)th layer, where N is the number of layers of the deep neural network. If the weight pre-learning of all the layers has not yet been completed (NO at step ST5$b$), the weight pre-learning unit 22 returns to the processing at step ST1$b$, and carries out the weight pre-learning described above for the next (upper) layers used as the learning target. In contrast, if the weight pre-learning of all the layers has been completed (YES at step ST5$b$), the weight pre-learning unit 22 terminates the pre-learning. Here, if the deep neural network has N layers, it performs pre-learning of (N−2) weights from $W_1$ to $W_{N-2}$.

Let us return to the description of FIG. 14.

When the weight pre-learning unit 22 terminates the pre-learning of the weights, the weight adjuster 23 optimizes the weights the weight pre-learning unit 22 pre-learns through fine tuning by supervised learning (step ST4$a$). Details of the fine tuning of the weights will now be described with reference to FIG. 17.

Figure 17:
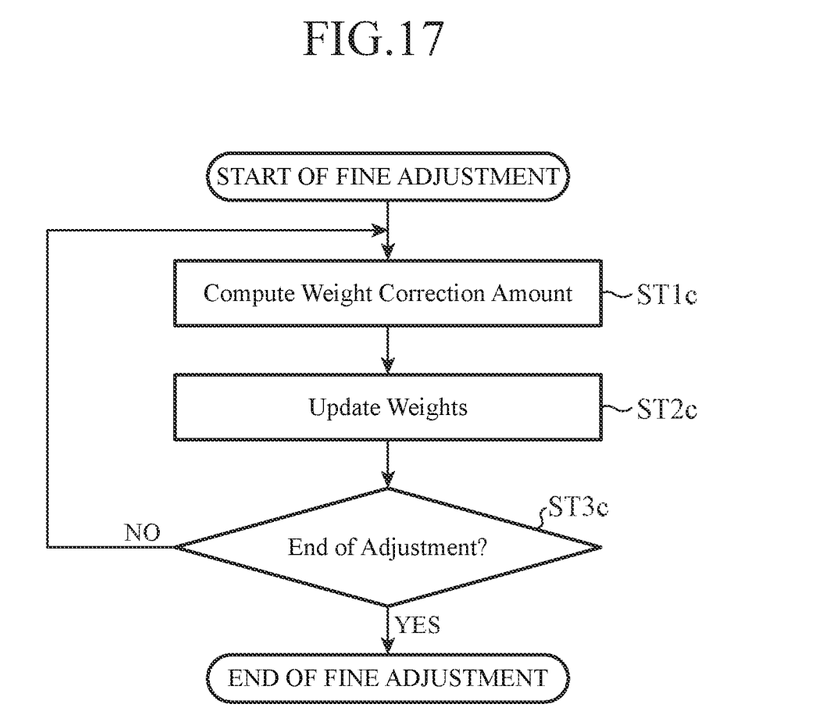
FIG. 17 is a flowchart showing the adjustment processing of the weights.

First, the weight adjuster 23 computes the correction values of the weights by optimizing the weights between the nodes the weight pre-learning unit 22 pre-learns by the supervised learning using the training data it reads out of the training data storage 5, in order to reduce the value of the evaluation function J that evaluates the learning error given by the foregoing Expression (3) (step ST1$c$).

Next, according to the correction values it obtains at step ST1$c$, the weight adjuster 23 updates the weight values between the nodes the weight pre-learning unit 22 pre-learns (step ST2$c$).

After the update of the weights between the nodes has been completed, the weight adjuster 23 confirms whether the end condition of the fine tuning of the weights is satisfied or not (step ST3$c$). Here, as the end condition, it is conceivable that the value of the evaluation function for computing the error between the training data and the discrimination result received from the discriminating processor 21 becomes equal to or less than a predetermined threshold, for example. Alternatively, it may be a case where the number of times of the learning becomes equal to or greater than a threshold.

When the weight adjuster 23 decides that the end condition is satisfied and the fine tuning of the weights is to be completed (YES at step ST3$c$), the weight adjuster 23 terminates the fine tuning of the weights. On the other hand, unless the end condition is satisfied (NO at step ST3$c$), the weight adjuster 23 returns to the processing at step ST1$c$, and repeats the fine tuning of the weights described above. Thus, the discriminating processor 21 can solve the classification problem or regression problem using the deep neural network updated by the weight values resulting from the optimization adjustment by the weight adjuster 23 of the weights which have been pre-learned by the weight pre-learning unit 22 about the weights between the nodes coupled in the loosely coupled parts.

In the deep neural network, when the number of the intermediate nodes or output nodes is low (equal to or less than 21, for example), it is expected as in the embodiment 1 that the calculation amount can be reduced sharply by making couplings between the nodes corresponding to the matrix elements of 1 in a check matrix of a finite geometry code such as a Euclidean geometry code or projective geometry code, or in a check matrix of a cyclic code such as a difference set cyclic code, in which check matrix the nodes of one of the layers are assigned to the row elements and the nodes of another of the layers are assigned to the column elements. This is because as is clearly seen from a result of the number of 1's with respect to the number of columns or the number of rows in the check matrix of a Euclidean geometry code shown in FIG. 6, in the check matrix of a projective geometry code shown in FIG. 7, and in the check matrix of a difference set cyclic code shown in FIG. 8, when the number of columns or the number of rows corresponding to the number of nodes is not greater than 21, the number of 1's is much fewer than the number of columns or the number of rows and loosely coupled parts can be formed between the nodes.

Incidentally, a cyclic code is a code generated by a cyclic shift of a code word, and has a regular arrangement. For this reason, it is suitable for the learning discrimination of time-series data, and when implemented in hardware, it is characterized by facilitating the design as compared with the other codes.

In addition, in the deep neural network, when the number of the intermediate nodes or output nodes is high (more than 21, for example), it is expected as in the embodiment 1 that the calculation amount can be reduced sharply by making couplings between the nodes on the basis of one of a check matrix of an LDPC code, a check matrix of a spatially-coupled code, and a check matrix of a pseudo-cyclic code. This is because in the check matrix of the LDPC code, spatially-coupled code or pseudo-cyclic code, the number of 1's contained in a row or the number of 1's contained in a column averages out at three to six independently of the number of rows or the number of columns. For example, even if setting the number of rows at 10000, the number of 1's contained in a row averages out at three to six, and the number of couplings between the nodes averages out at three to six, thus forming loose couplings. Accordingly, it can reduce the calculation amount sharply. In particular, since the check matrix of a spatially-coupled code shown in FIG. 9 is a matrix with 1's arranged in a band, a maximum reduction in the calculation amount can be expected from the view point of facilitating the control.

As described above, according to the present the present embodiment 2, it comprises the weight pre-learning unit 22 to generate the loosely coupled parts by forming couplings between partial nodes in the deep neural network comprising the input layer, the plurality of intermediate layers and the output layer, each of the layers comprising nodes, in accordance with the check matrix of the error correcting code, and to perform the unsupervised learning of the weights between the nodes coupled; the weight adjuster 23 to adjust the weights the weight pre-learning unit 22 has learned by the supervised learning; and the discriminating processor 21 to solve a classification problem or a regression problem using the deep neural network whose weights between the nodes coupled are updated by the weight values adjusted by the weight adjuster 23. Thus forming the loose couplings in the deep neural network makes it possible to speed up the classifier learning and discriminating processing. In particular, since the deep neural network has a greater number of the intermediate layers as compared with the hierarchical neural network shown in embodiment 1, and has a greater number of portions in which the loosely coupled parts can be formed, it has a higher reduction effect of the product-sum operation between the nodes. In addition, since it generates the loose couplings independently of the learning data, even if the learning data is changed or corrected, it can save time and effort for pre-learning.

Incidentally, it is to be understood that a free combination of the individual embodiments, variations of any components of the individual embodiments or removal of any components of the individual embodiments is possible within the scope of the present invention.

INDUSTRIAL APPLICABILITY

A hierarchical neural network apparatus in accordance with the present invention can speed up the classifier learning and discriminating processing by forming loose couplings in the hierarchical neural network independently of the learning data. Accordingly, it is applicable to information processing relating to various control, prediction and diagnosis.

DESCRIPTION OF REFERENCE SYMBOLS 1, 1A hierarchical neural network apparatus; 2, 2A classifier learning unit; 3 weight storage; 4 learning data storage; 5 training data storage; 20 weight learning unit; 21 discriminating processor; 22 weight pre-learning unit; 23 weight adjuster.

What is claimed is:

1. A hierarchical neural network apparatus comprising:
a computer processor; and
a memory storing instructions which, when executed by the computer processor, perform a process including,
forming a hierarchical neural network, wherein the hierarchical neural network comprises an input layer, an intermediate layer, and an output layer, and wherein each layer comprises nodes;
generating loose couplings between nodes in the layers, wherein the loose couplings are generated in accordance with a sparse parity-check matrix comprising at least two error correcting codes, wherein the generation of said loose couplings is operative to eliminate couplings between respective nodes in said input and intermediate layers and to eliminate couplings between respective nodes in said intermediate and output layers, wherein each of the at least two error correcting codes is a pseudorandom number code, finite geometry code, cyclic code, pseudo-cyclic code, or spatially-coupled code, and wherein each of the at least two error correcting codes is a different error correcting code type;
learning weights between a plurality of nodes in the hierarchical neural network based on the loose couplings between nodes; and
solving a classification problem or a regression problem using the hierarchical neural network whose weights between the nodes coupled are updated by values of the learned weights.

2. The hierarchical neural network apparatus according to claim 1, wherein the process further includes,
adjusting the weights by supervised learning; and wherein the intermediate layer comprises a plurality of layers and the weights between the nodes coupled are updated by weight values adjusted by the weight adjusting step.

3. A classifier learning method, which learns a hierarchical neural network comprising an input layer, intermediate layer and output layer, each of the layers comprising nodes, wherein the method comprises:
generating loose couplings between nodes in the layers, wherein the loose couplings are generated in accordance with a sparse parity-check matrix comprising at least two error correcting codes, wherein the generation of said loose couplings is operative to eliminate couplings between respective nodes in said input and intermediate layers and to eliminate couplings between respective nodes in said intermediate and output layers, thereby eliminating the necessity to learn weights between said respective nodes in said input and intermediate layers and between said respective nodes in said intermediate and output layers, wherein each of the at least two error correcting codes is a pseudorandom number code, finite geometry code, cyclic code, pseudo-cyclic code, or spatially-coupled code, and wherein each of the at least two error correcting codes is a different error correcting code type;
computing a plurality of correction values of weights between a plurality of nodes in the hierarchical neural network; and
updating weight values between the nodes by the correction values.

4. The classifier learning method according to claim 3, wherein the method further comprises:
adjusting the weight values by supervised learning.

5. A discriminating method to make a discrimination using the hierarchical neural network whose weight values between the nodes are updated by the classifier learning method as defined in claim 3.

6. A discriminating method to make a discrimination using the neural network whose weight values between the nodes are updated by the classifier learning method as defined in claim 4.

* * * * *